(12) United States Patent
Liao

(10) Patent No.: US 11,949,242 B1
(45) Date of Patent: Apr. 2, 2024

(54) WIRELESS CHARGER WITH FLOWING DISPLAY EFFECT

(71) Applicant: Ping Liao, Yichun (CN)

(72) Inventor: Ping Liao, Yichun (CN)

( * ) Notice: Subject to any disclaimer, the term of this patent is extended or adjusted under 35 U.S.C. 154(b) by 0 days.

(21) Appl. No.: 18/212,149

(22) Filed: Jun. 20, 2023

(51) Int. Cl.
| | |
|---|---|
| *H02J 50/00* | (2016.01) |
| *F21K 9/65* | (2016.01) |
| *H02J 7/00* | (2006.01) |
| *H02J 50/10* | (2016.01) |
| *F21Y 115/10* | (2016.01) |

(52) U.S. Cl.
CPC ............... *H02J 50/10* (2016.02); *F21K 9/65* (2016.08); *H02J 7/0042* (2013.01); *H02J 50/005* (2020.01); *F21Y 2115/10* (2016.08)

(58) Field of Classification Search
CPC ...................................................... H02J 50/90
USPC .......................................................... 320/108
See application file for complete search history.

(56) References Cited

U.S. PATENT DOCUMENTS

2019/0013832 A1* 1/2019 Mody .................. H04B 1/3888

FOREIGN PATENT DOCUMENTS

| CN | 216489800 U | * | 5/2022 | |
| WO | WO-2022077612 A2 | * | 4/2022 | ......... B60R 11/0241 |

* cited by examiner

*Primary Examiner* — Edward Tso
*Assistant Examiner* — Ahmed H Omar
(74) *Attorney, Agent, or Firm* — Jose Cherson Weissbrot

(57) ABSTRACT

The present invention provides a wireless charger with a flowing display effect, which comprises a shell, a wireless charging module and an effect display module, wherein the wireless charging module and the effect display module are respectively arranged in a first accommodating space and a second accommodating space formed by the shell, and users can directly use the wireless charger for charging operation; when the wireless charger is idle, the effect display module can provide better enjoyment and can interact with users, thus greatly improving the user's experience.

6 Claims, 9 Drawing Sheets

US 11,949,242 B1

WIRELESS CHARGER WITH FLOWING DISPLAY EFFECT

TECHNICAL FIELD

The present invention relates to the technical field of wireless chargers, in particular to a wireless charger with quicksand display effect.

BACKGROUND

The present invention relates to the technical field of wireless chargers, in particular to a wireless charger with quicksand display effect.

SUMMARY

The present invention provides a wireless charger with flowing display effect, which comprises a shell, a wireless charging module and an effect display module. The shell comprises a top cover, a middle cover and a bottom cover;

wherein, one end of the top cover is a supporting surface for placing electronic equipment, and the other end is provided with a first opening, and the first opening is recessed inward to form a first accommodating space; the first accommodating space comprises a relatively flat base and a first sidewall, and the first sidewall surrounds an outer edge of the base and extends outward in a direction away from the base;

the bottom cover has a second accommodating space, and the bottom cover is made of a transparent material; the bottom cover further comprises a second opening, which defines a passage for the effect display module to enter the second accommodating space, and the second opening further comprises a second inner edge, and the second inner edge coincides with the outer edge of the middle cover;

the middle cover is fixedly connected with the top cover and the bottom cover and encloses the first accommodating space and the second accommodating space; the wireless charging module comprises a magnet, an induction coil and a circuit board, wherein the magnet and the induction coil are embedded in the first accommodating space; the effect display module is arranged in the second accommodating space and comprises at least one display cavity; a flowable medium is arranged in the display cavity, and the display cavity further comprises at least one visual window through which the flowable medium in the display cavity can be observed.

BRIEF DESCRIPTION OF DRAWINGS

In order to explain the technical solution of this application more clearly, the drawings needed in the implementation will be briefly introduced below. Obviously, the drawings described below are only some implementations of this application. For those skilled in the art, other drawings can be obtained according to these drawings without creative work.

IN THE FIGURES

Figure 1:
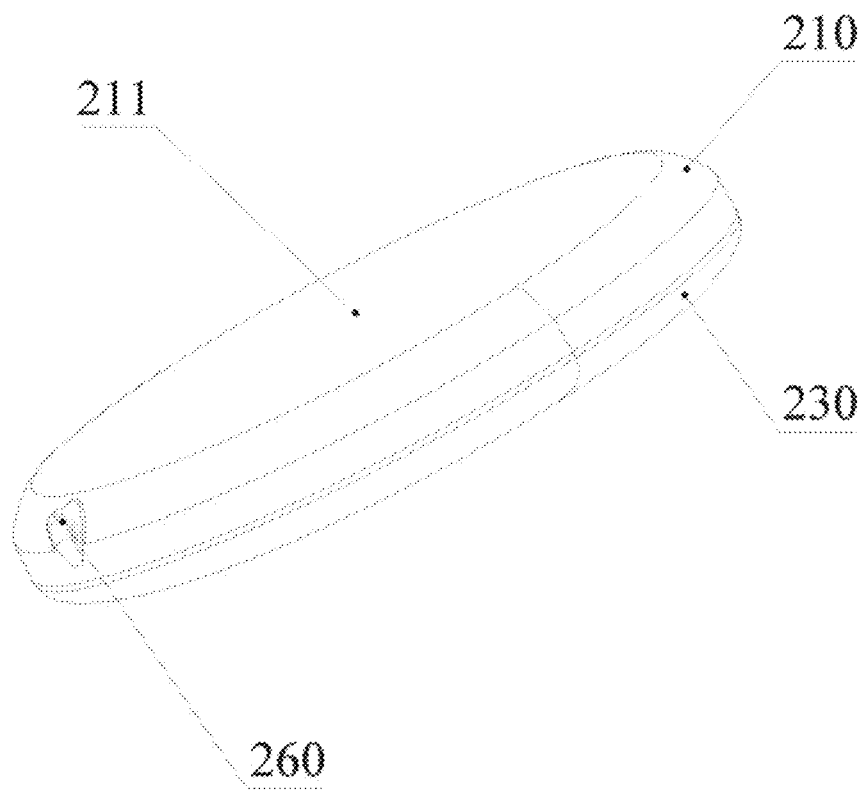
FIG. 1 is a schematic perspective view of the present invention.

200, Shell; 210, top cover, 211, Supporting surface; 212, First opening; 213, First inner edge; 220, Middle cover; 221, Buckling position; 222, Outer edge; 223, Fasteners; 230, Bottom cover; 231, Second inner edge; 232, Slot; 233, Second opening; 240, First accommodating space; 241, Base; 242, First sidewall; 243, Positioning block; 244, Protruding column; 245, Limiting block; 246, Buckle; 247, protrusion; 250, Second accommodation space; 260, Power supply through hole; 300, Wireless charging module; 310, Magnet; 311, Central through hole; 312, Positioning groove; 320, Induction coil; 321, Positioning through hole; 330, Circuit board; 331, Lamp beads; 340, Gasket; 400, Effect display module; 500, Diffusion mode; 600, Mylar.

DESCRIPTION OF EMBODIMENTS

In the following, the technical solution in the embodiment of the application will be clearly and completely described with reference to the drawings in the embodiment of the application. Obviously, the described embodiment is only a part of the embodiment of the application, but not the whole embodiment. Based on the embodiments in this application, all other embodiments obtained by those skilled in the art without creative labor belong to the protection scope of this application.

Reference to "an example" or "an embodiment" herein means that a particular feature, structure or characteristic described in connection with an embodiment or an embodiment can be included in at least one embodiment of this application. The appearance of this phrase in various places in the specification does not necessarily refer to the same embodiment, nor is it an independent or alternative embodiment mutually exclusive with other embodiments. It is understood explicitly and implicitly by those skilled in the art that the embodiments described herein can be combined with other embodiments.

In this specification, for the sake of convenience, words and expressions indicating orientation or positional relationship such as "middle", "upper", "lower", "front", "rear", "vertical", "horizontal", "top", "inner" and "outer" are used to illustrate the positional relationship of constituent elements with reference to the attached drawings, only for the convenience of description. The positional relationship of the constituent elements is appropriately changed according to the direction of the described constituent elements. Therefore, it is not limited to the words and expressions described in the specification, and can be replaced appropriately according to the situation.

As shown in FIG. 1 to FIG. 8, a wireless charger with flowing display effect provided by the present invention includes a shell 200, a wireless charging module 300 and an effect display module 400, wherein the wireless charging module 300 and the effect display module 400 are respectively arranged in a first accommodating space 240 and a second accommodating space 250 formed by the shell 200, and users can directly use the wireless charger for charging operation. When the wireless charger is idle, the effect display module 400 can provide better viewing and can interact with users, greatly improving the user's experience.

Specifically, as shown in FIGS. 1 to 8, the shell 200 includes a top cover 210, a middle cover 220 and a bottom cover 230, wherein the top cover 210 has a first accommodating space 240 and the bottom cover 230 has a second accommodating space 250, and the bottom cover 230 is made of a transparent material, and the middle cover 220 is fixedly connected with the top cover and the bottom cover 230 to enclose the first accommodating space 240 and the second accommodating space 250;

the wireless charging module 300 comprises a magnet 310, an induction coil 320 and a circuit board 330, wherein the magnet 310 and the induction coil 320 are embedded in the first accommodating space 240; the effect display module 400 is arranged in the second accommodating space 250, and includes at least one display cavity, in which a flowable medium is arranged, and at least one visual window through which the flowable medium in the display cavity can be observed.

Figure 4:
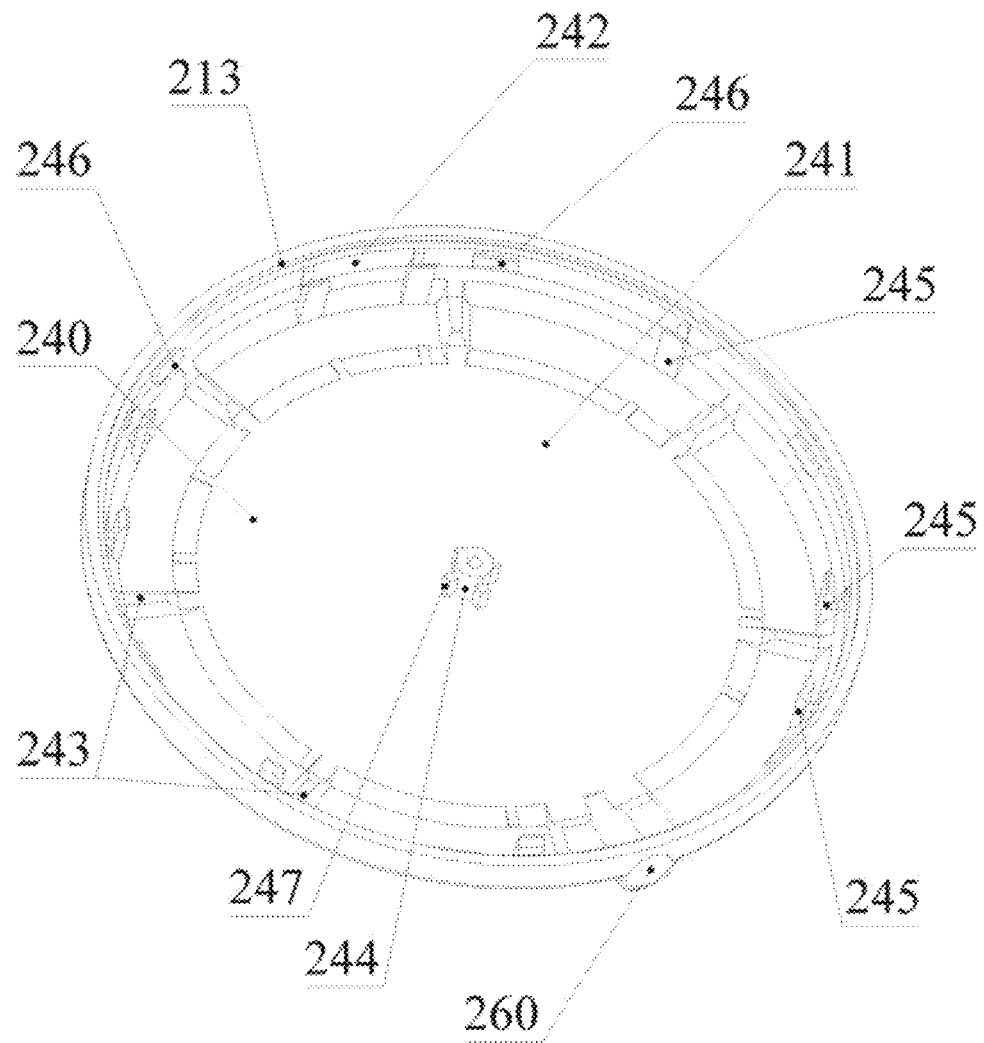
FIG. 4 is a schematic structural diagram of the top cover.
Figure 5:
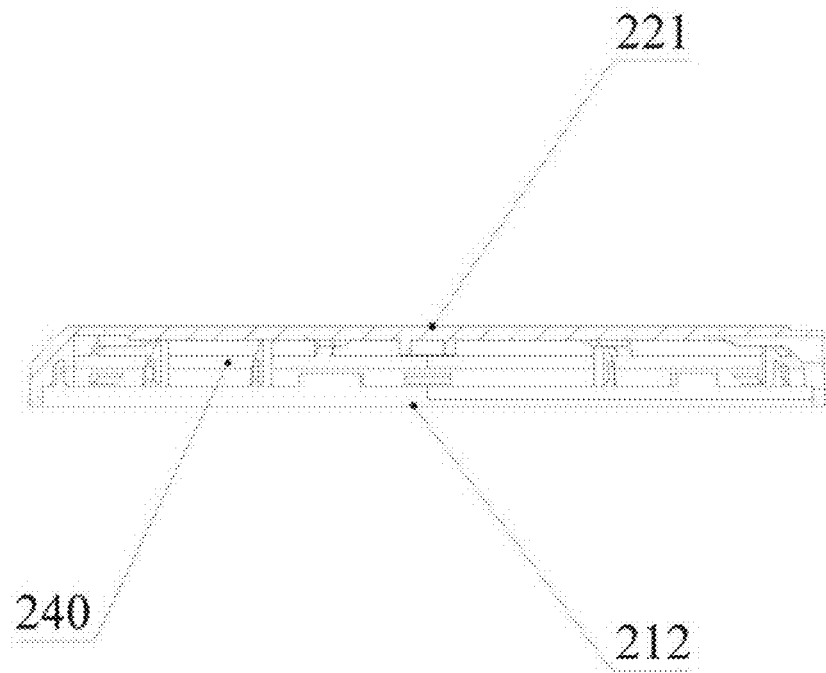
FIG. 5 is a sectional view of the top cover.
Figure 6:
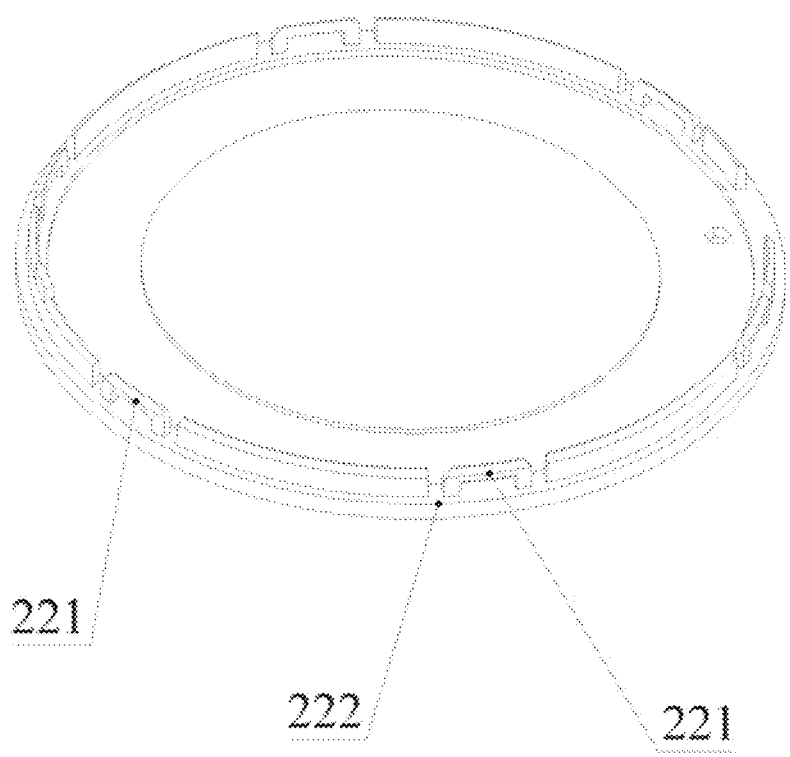
FIG. 6 is a schematic view of the middle cover.
Figure 7:
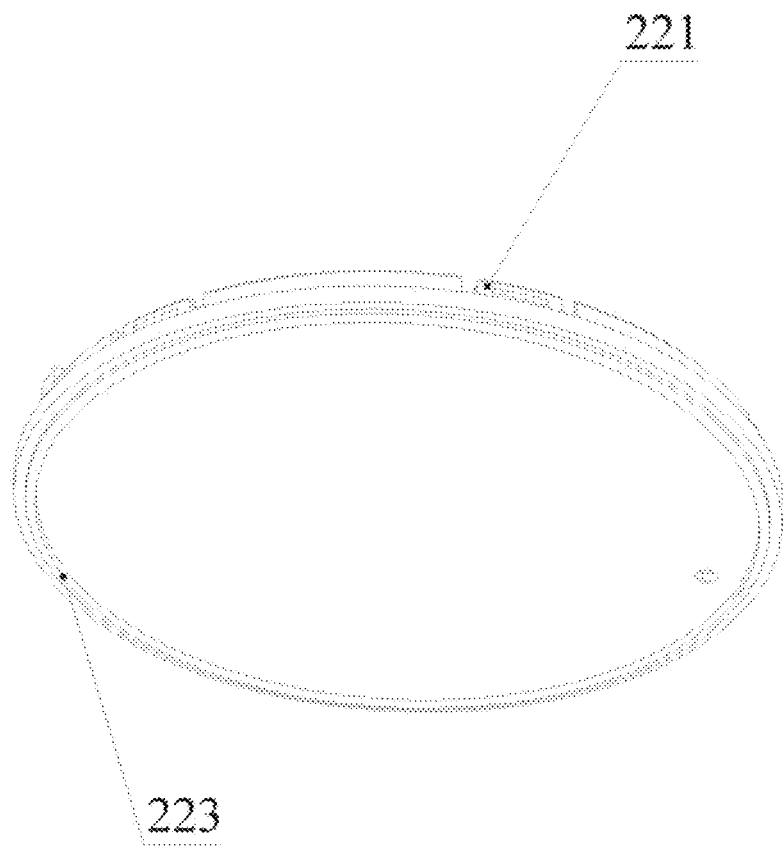
FIG. 7 is another schematic view of the middle cover.

As shown in FIG. 1, FIG. 4 and FIG. 5, one end of the cover 210 is a supporting surface 211 for placing electronic equipment, and the other end is provided with a first opening 212, which is recessed inward to form a first accommodating space 240, which includes a relatively flat base 241 and a first sidewall 242, which surrounds the outer edge of the base (241) and faces away from the base (241). A plurality of positioning blocks 243 are formed on the base 241, and a plurality of limiting blocks 245 are also arranged on the first sidewall 242. The limiting blocks 245 are evenly distributed around the first sidewall 242, and a protruding column 244 is also formed in the central position of the base 241. In this embodiment, the track of the outer edge of the base 241 is generally circular, so that the first sidewall 242 has a cylindrical surface. In some embodiments, the shape of the base 241 can also be rectangular or any other desired geometric shape.

Figure 2:
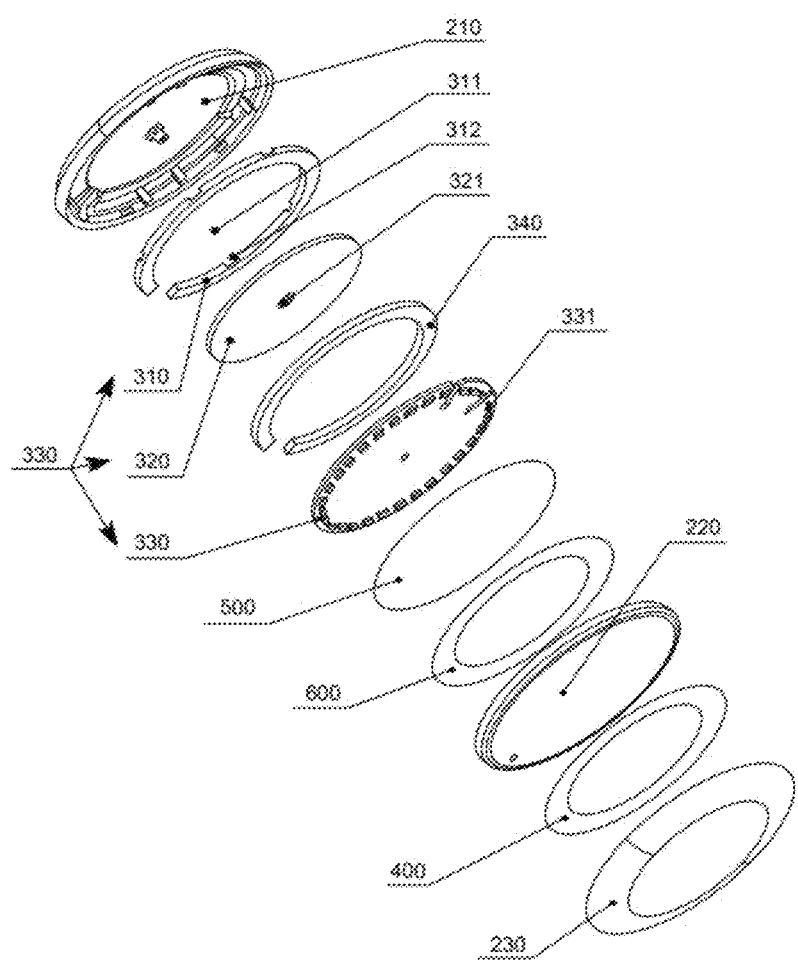
FIG. 2 is an explosion schematic diagram of the present invention.

In this embodiment, the magnet 310 and the induction coil 320 are configured to be embedded in the first accommodating space. Specifically, as shown in FIG. 2, the magnet 310 is arranged in a ring shape to correspond to the substantially circular base 241. In some embodiments, the magnet 310 can also have any desired geometric shape.

As shown in FIG. 2, the positioning blocks 243 are matched with the positioning grooves 312. When the magnet 310 is arranged in the first accommodating space 240, a plurality of limiting blocks 245 clamp the magnet 310, and at the same time, a plurality of positioning blocks 243 are embedded in the corresponding positioning grooves 312 to limit and position the magnet 310. The magnet 310 further comprises a central through hole 311 and a plurality of positioning grooves 312, wherein the transverse width of the induction coil 320 is smaller than the diameter of the central through hole 311 and is arranged in the central through hole 311, and the central position of the induction coil 320 is also provided with a positioning through hole 321, which is configured to be penetrated by the protruding column 244 and to limit the movement of the induction coil 320. In this embodiment, The outer surface of the protruding column 244 is also provided with a plurality of protrusions 247 to increase the clamping ability of the protruding column 244 to the induction coil 320. When the protruding column 244 passes through the through hole 321, the movement of the induction coil 320 can be effectively limited by friction, and at the same time, the induction coil 320 is positioned in the central position of the cover 210, so that the wireless charger has a better charging effect.

As shown in FIGS. 1 and 2, one end of the cover 210 is also provided with a power through hole 260, and the power cord is electrically connected with the circuit board 330 through the power through hole 260 to provide power for the wireless charger. In this embodiment, the circuit board 300 is arranged above the induction coil 320 and the magnet 310. In order to avoid short circuit of the circuit board 330 and protect the circuit board 330, the present invention also provides a gasket 340, which is made of an EVA material and is arranged between the circuit board 330, the magnet 310 and the induction coil 320, which can effectively buffer and support the circuit board 330. In some embodiments, the gasket 340 can also be made of rubber or has insulating properties.

In order to further fix the wireless charging module 300, the first accommodating space 240 is further enclosed by the middle cover 220. Specifically, as shown in FIG. 4, the first sidewall 242 of the front cover 210 is also provided with a plurality of buckles 246, and the middle cover 220 is provided with a plurality of buckles 221 (see FIG. 6) which are adapted to the buckles 246, and the outer edge 222 of the middle cover 220 is in contact with the first inner edge of the first opening 212. When the buckle 246 and the buckling position 221 form a snap fit, the middle cover 220 encloses the first accommodating space 240 to further fix the wireless charging module 300.

Figure 3:
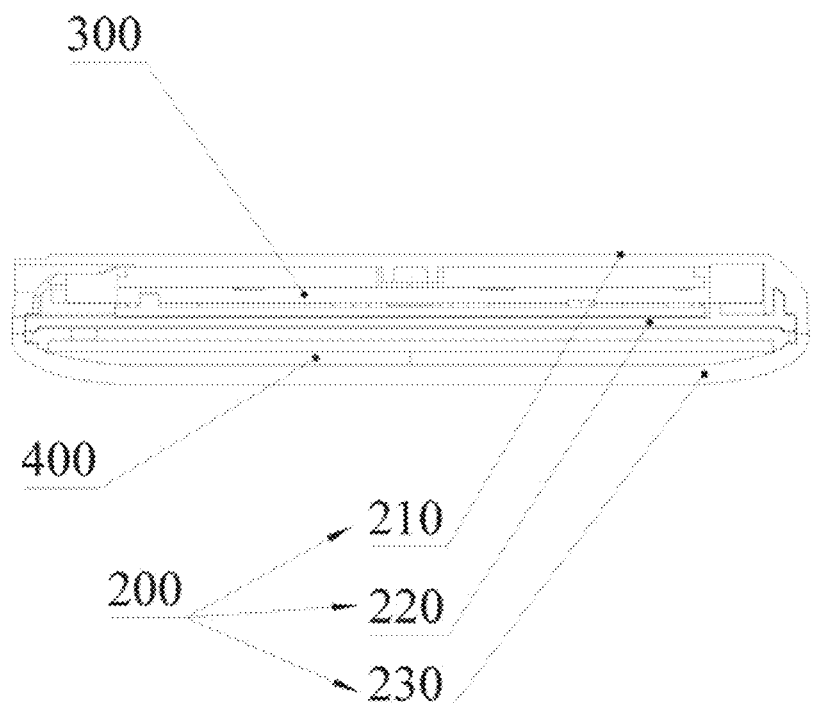
FIG. 3 is a sectional view of the present invention.

As a preferred embodiment of the present invention, in order to increase the ornamental performance of the wireless charger and the interactive entertainment with users, the present invention further comprises an effect display module 400, as shown in FIG. 3, which is arranged in the second accommodating space 250 and comprises at least one display cavity, in which a flowable medium is arranged, and at least one visual window through which the flowable medium in the display cavity can be observed. In other embodiments, the display cavity can also be provided with a plurality of visual windows and a corresponding number of display cavities, so that the effect display module can realize a three-dimensional dynamic display effect by using the cooperation of a plurality of visual windows and flowing media in the process of rotating display.

Figure 8:
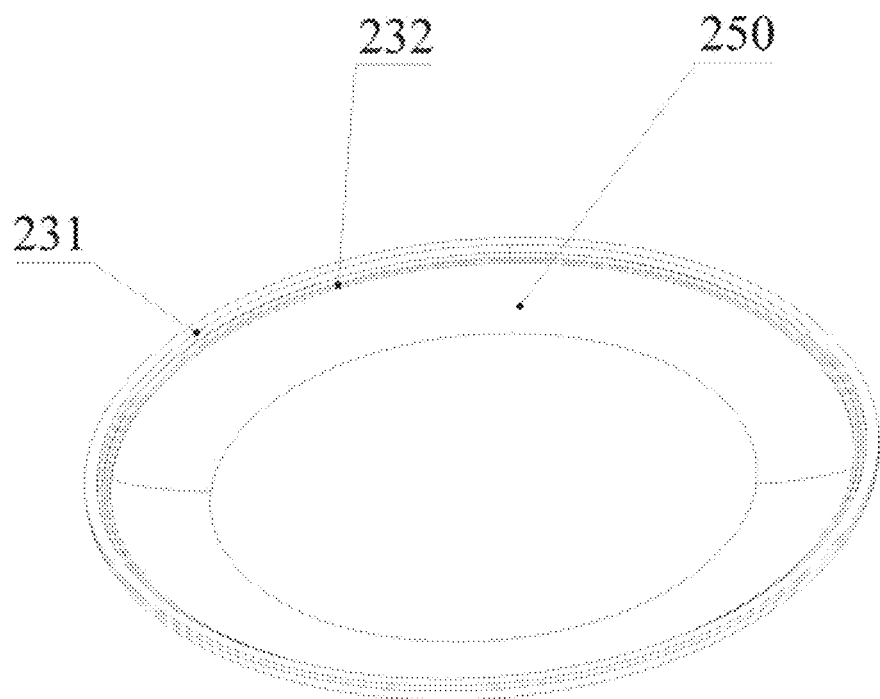
FIG. 8 is a schematic view of the bottom cover.
Figure 9:
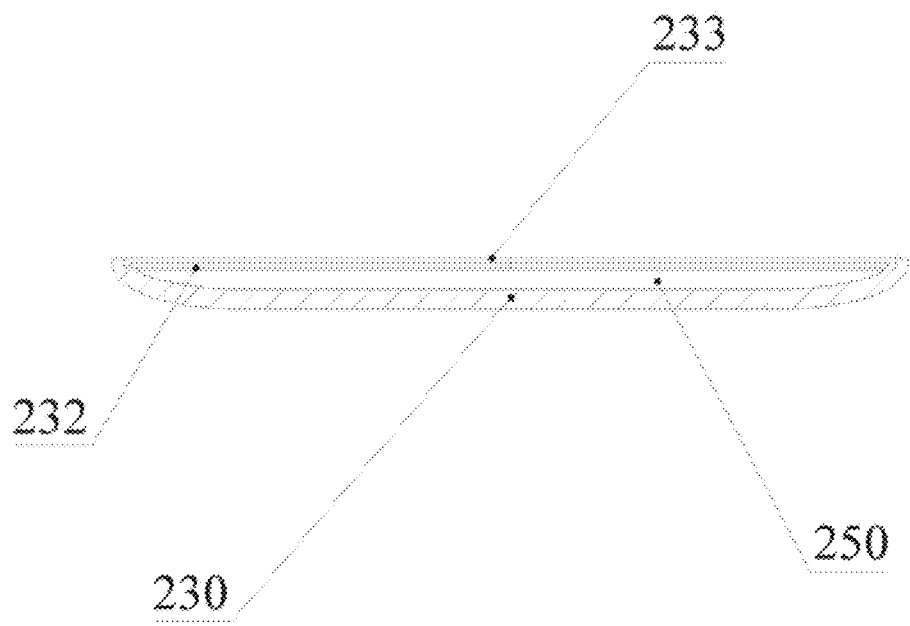
FIG. 9 is a sectional view of the bottom cover.

In this embodiment, as shown in FIGS. 8 and 9, the second accommodating space 250 is formed in the bottom cover 230, which includes a second opening 233, which defines the passage for the effect display module 400 to enter the second accommodating space 250, and the second opening 233 also includes a second inner edge 231, which coincides with the outer edge 222 of the middle cover 220. The second inner edge 231 of the bottom cover 230 is provided with a slot 232 adapted to the fastener 223. When the fastener 223 and the slot 232 form a snap fit, the middle cover 220 encloses the second accommodating space 250 to confine the effect display module 400 in the second accommodating space 250.

In this embodiment, the flowable medium in the exhibition cavity includes quicksand medium, and decorative blocks (not shown in the figure) can also be arranged in the quicksand medium, and the decorative blocks can flow with the quicksand medium to further increase the flowing effect of quicksand and improve the appreciation. In some embodiments, the flowable medium in the exhibition cavity can also be other flowable liquids, including but not limited to decorative mineral oil.

In order to further improve the ornamental performance of the wireless charger, as shown in FIG. 2, the circuit board 330 is also provided with a plurality of LED lamp beads 331, which are fixed on the middle cover 220 by screws, and the middle cover 220 is also configured to be made of transparent material, so that the light emitted by the lamp beads 331 can directly penetrate the middle cover 220 to reach the second accommodating space 250, and cooperate with the flowable medium in the display cavity to make the ornamental performance of the wireless charger better. In order to further enhance the lighting effect of the LED lamp bead 331, as shown in FIG. 2, the present invention also provides a diffusion die 500 and a mylar 600, which can make the light diffuse more evenly, and the mylar 600 can surround and protect the LED lamp bead 331 in all directions, making the LED lamp bead 331 safer in operation.

The wireless charger with flowing display effect provided by the present invention can be directly used by users for charging operation. When the wireless charger is idle, users can observe the effect display module 400 accommodated in the second accommodating space 240 through the bottom cover 230 made of transparent material. The display cavity in the effect display module 400 is provided with a flowable medium, including but not limited to quicksand medium or other decorative mineral oil, which can provide users with better enjoyment and interactive play.

The technical means disclosed in the solution of the present invention are not limited to the technical means disclosed in the above embodiments, but also include the technical solution composed of any combination of the above technical features. It should be pointed out that for those skilled in the art, several improvements and embellishments can be made without departing from the principle of the present invention, and these improvements and embellishments are also regarded as the protection scope of the present invention.

What is claimed is:

1. A wireless charger with flowing display effect, comprising a shell (200), a wireless charging module (300) and an effect display module (400), wherein, the shell (200) comprises a top cover (210), a middle cover (220) and a bottom cover (230), wherein one end of the top cover (210) is a supporting surface for placing electronic equipment, and the other end is provided with a first opening (212), and the first opening is recessed inward to form a first accommodating space (240); the first accommodating space (240) comprises a relatively flat base (241) and a first sidewall (242), and the first sidewall (242) surrounds an outer edge of the relatively flat base (241) and extends outward in a direction away from the base (241);

the bottom cover (230) has a second accommodating space (250), and the bottom cover (230) is made of a transparent material; the bottom cover (230) further comprises a second opening (233), which defines a passage for the effect display module (400) to enter the second accommodating space (250), and the second opening (233) further comprises a second inner edge (231), and the second inner edge (231) coincides with the outer edge (222) of the middle cover (220);

the middle cover (220) is fixedly connected with the top cover (210) and the bottom cover (230) and encloses the first accommodating space (240) and the second accommodating space (250);

the wireless charging module (300) comprises a magnet (310), an induction coil (320) and a circuit board (330), wherein the magnet (310) and the induction coil (320) are embedded in the first accommodating space (240);

the magnet (310) is arranged in a ring shape and further comprises a central through hole (311) and a plurality of positioning grooves (312), a lateral width of the induction coil (320) is smaller than a diameter of the central though through hole (311), and a central position of the induction coil (320) is also provided with a positioning through hole (321), a plurality of positioning blocks (243) on the relatively flat base (241) matched with the plurality of positioning grooves (312) on the magnet are formed on the relatively flat base (241) of the first accommodating space (240), a plurality of limiting blocks (245) are arranged on the first sidewall (242) of the first accommodating space (240), and a protruding column (244) is formed at the central position of the relatively flat base (241); and and the effect display module (400) is arranged in the second accommodating space (250) and comprises at least one display cavity; a flowable medium is arranged in the display cavity, and the display cavity further comprises at least one visual window through which the flowable medium in the display cavity can be observed.

2. The wireless charger with flow display effect according to claim 1, wherein a plurality of the limiting blocks (245) are evenly distributed around the first sidewall (242), and when the magnet is arranged in the first accommodating space (240), the limiting blocks (245) clamp the magnet (310) tightly, and the positioning blocks (243) are embedded in the corresponding positioning grooves (312) to limit and position the magnet (310).

3. The wireless charger with flow display effect according to claim 2, wherein the induction coil (320) is arranged in the central through hole (311), and the protruding column (244) passes through the positioning through hole of the induction coil (320) to position the induction coil (320).

4. The wireless charger with flowing display effect according to claim 3, wherein the first sidewall (242) is further provided with a plurality of buckles (246), and the middle cover (220) is provided with a plurality of buckling positions (221) adapted to the buckles (246), and an outer edge of the middle cover (220) coincides with a first inner edge of the first opening (212), and when the buckles (246) and the buckling positions (221) form a snap fit, the middle cover (220) encloses the first accommodating space (240).

5. The wireless charger with flowing display effect according to claim 4, wherein a plurality of fasteners (223) are also formed on the middle cover (220), and the second inner edge (231) of the bottom cover (230) is provided with slots adapted to the fasteners (223), and when the fasteners (223) and the slots form snap fit, the middle cover (220) encloses the second accommodating space (250).

6. The wireless charger with flowing display effect according to claim 5, wherein the flowable medium in the display cavity comprises quicksand medium, and the quicksand medium comprises decorative blocks, and the decorative blocks can flow with the quicksand medium.

* * * * *